United States Patent [19]

Yanagida

[11] 4,286,506
[45] Sep. 1, 1981

[54] AIR VENTILATION APPARATUS FOR VEHICLE

[75] Inventor: Toshio Yanagida, Tokyo, Japan

[73] Assignee: Nissan Motor Company, Limited, Yokohama City, Japan

[21] Appl. No.: 963,646

[22] Filed: Nov. 24, 1978

[30] Foreign Application Priority Data

Mar. 29, 1978 [JP] Japan .................. 53/39348[U]

[51] Int. Cl.³ .................................. B60H 1/00
[52] U.S. Cl. ................................ 98/2; 285/24; 285/27; 285/31
[58] Field of Search ............. 98/2, 2.05, 2.07, 2.06, 98/2.11, 2.16, 2.17, 2.04; 165/41; 285/24, 18, 27, 31, 32, 33; 138/128, 158

[56] References Cited

U.S. PATENT DOCUMENTS

| | | | |
|---|---|---|---|
| 1,995,446 | 3/1935 | Blake | 138/128 |
| 2,797,955 | 7/1957 | Wilfert | 285/31 |
| 2,963,090 | 12/1960 | Cole et al. | 285/27 |
| 3,180,611 | 4/1965 | Weiland | 98/2 |
| 3,190,206 | 6/1965 | Brueder | 98/2 |
| 3,648,480 | 3/1972 | Watts | 98/2 |
| 3,851,898 | 12/1974 | Ihara | 285/24 |
| 4,101,148 | 7/1978 | Lee | 285/24 X |

Primary Examiner—Albert J. Makay
Assistant Examiner—Henry Bennett
Attorney, Agent, or Firm—Schwartz, Jeffery, Schwaab, Mack, Blumenthal & Koch

[57] ABSTRACT

A hollow body with first and second open ends is spanned between a dashboard and an instrument panel in such a manner that the first open end is open to a fresh air inlet opening formed in the dashboard and the second open end is supported by the instrument panel. A guide member is mounted on the mouth of the first open end of the hollow body to aid in locating the first open end during the connection of the same to the dashboard while allowing air to flow thereover to enter the hollow body.

7 Claims, 7 Drawing Figures

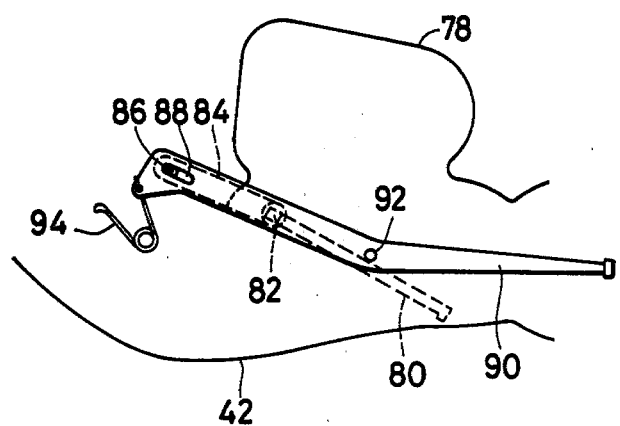
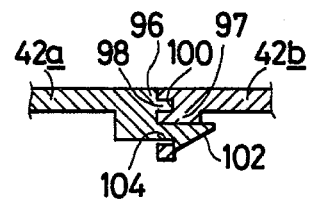
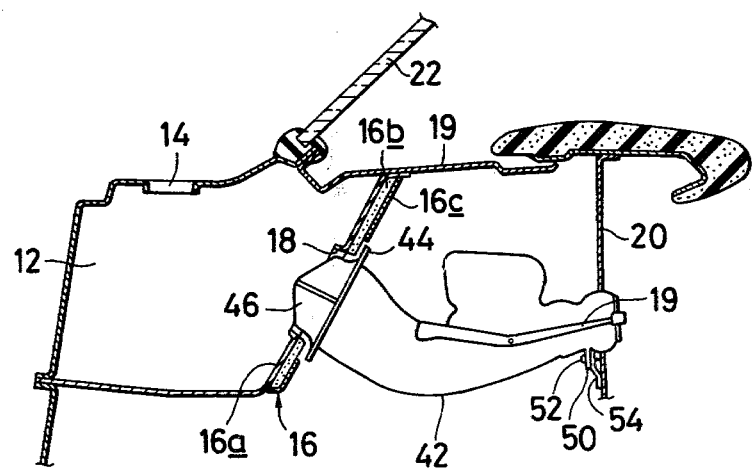

AIR VENTILATION APPARATUS FOR VEHICLE

BACKGROUND OF THE INVENTION

The present invention relates in general to an automotive air ventilation system and more particularly to an air ventilation apparatus mounted in the front section of passenger compartment to feed fresh air into the compartment.

SUMMARY OF THE INVENTION

It is an object of the present invention to provide an improved air ventilation apparatus which is easily mounted in the vehicle body during assemblage thereof.

It is another object of the present invention to provide an improved air ventilation apparatus by which a considerable amount of fresh air is smoothly fed into the passenger compartment.

It is still further object of the present invention to provide an improved air ventilation apparatus which is characterized in its simple and minimum number of parts.

According to the present invention, there is provided an air ventilation apparatus mounted in a vehicle having a partition wall and an instrument panel which are spaced from each other to define a considerable space therebetween, the partition wall being formed with an opening which is communicable with the environment, the ventilation apparatus comprising: a hollow body having a first open end thereof attached to the partition wall to open to the opening in the same and a second open end thereof supported by the instrument panel; and a guide member mounted on the mouth of the first open end of the hollow body, the guide member being shaped and constructed to aid in locating the first open end during the connection of the same to the partition wall while allowing air to flow thereover to enter the hollow body.

BRIEF DESCRIPTION OF THE DRAWINGS

Other objects and advantages of the present invention will become clear from the following description when taken in conjunction with the accompanying drawings, in which:

FIG. 5 is a schematic view for explaining the construction of damper door mechanism equipped in the air ventilation apparatus of the present invention;

FIG. 6 is a sectional view for explaining connecting technique adopted to assemble two segments of the duct member into a single tubular construction; and FIG. 7 is a sketch in section, explaining the assemblage manner of the ventilation apparatus of the invention with respect to parts located in the front section of the passenger compartment.

DETAILED DESCRIPTION OF A PREFERRED EMBODIMENT

Prior to describing the construction of the air ventilation apparatus of the invention, explanation of two exemplary prior art ventilation apparatus will be made with reference to FIGS. 1 and 2 in order to clarify the inventive steps of the invention.

Figure 1:
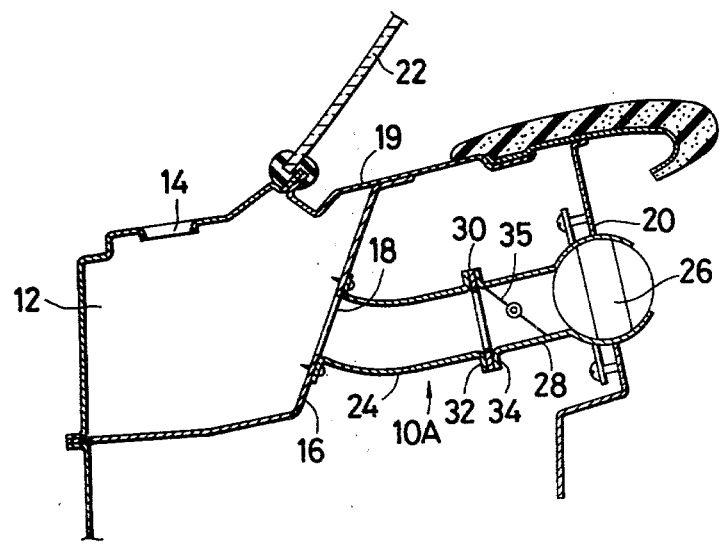
FIGS. 1 and 2 are sketches in section, respectively showing two conventional air ventilation apparatus mounted in the front section of the passenger compartment.

In FIG. 1, the first exemplary prior art air ventilation apparatus denoted by numeral 10A is shown as being mounted in a front section of the passenger compartment of a vehicle. The front section hereinshown comprises a cowl box 12 having a fresh air inlet opening 14, a dashboard 16 constituting a rear section of the cowl box 12 and having an opening 18, a horizontal panel 19 extending rearwardly from the upper section of the cowl box 12, an instrument panel unit 20 spaced from the dashboard 16 to define therebetween a considerable space (no numeral), and a wind shield 22 located above the cowl box 12.

As is shown in the drawing, the air ventilation apparatus 10A is disposed in the space between the dashboard 16 and the instrument panel unit 20, and comprises a duct 24 fixed via bolts (no numerals) to the dashboard 16 and open to the opening 18 of the same, and an air flow controller unit 26 supported via bolts (no numerals) by the instrument panel 20 and having a duct portion 28 connected to the downstream end of the duct 24. The connection between the duct 24 and the duct portion 28 is such made that flanges 32 and 34 provided on the corresponding parts abut against each other with interposition of a sealing member 30. Denoted by numeral 35 is a damper door which controls the amount of air flowing through the ventilation apparatus 10A.

In assemblage, the following procedure is usually adopted:

At first, the duct 24 only is connected to the dashboard 16 by means of bolts to allow the right open end to extend toward the instrument panel 20, and then the instrument panel unit 20 on which the air flow controller unit 26 has been previously mounted is fixed to rigid members (not shown) of the vehicle body in such a manner that the flange 34 of the duct portion 28 meets the flange 32 of the duct 24 via the sealing member 30.

Under this assemblage procedure, however, it sometimes happens that the two flanges 34 and 32 fail to meet accurately, originating from difficulty of setting the instrument panel 20 to a predetermined right position with respect to the vehicle body, so that the air passage defined in the duct 24 and the duct portion 28 is undesirably narrowed at the flanges 34 and 32. Thus, the air flow in the passage of the ventilation apparatus 10A is restricted.

Figure 2:
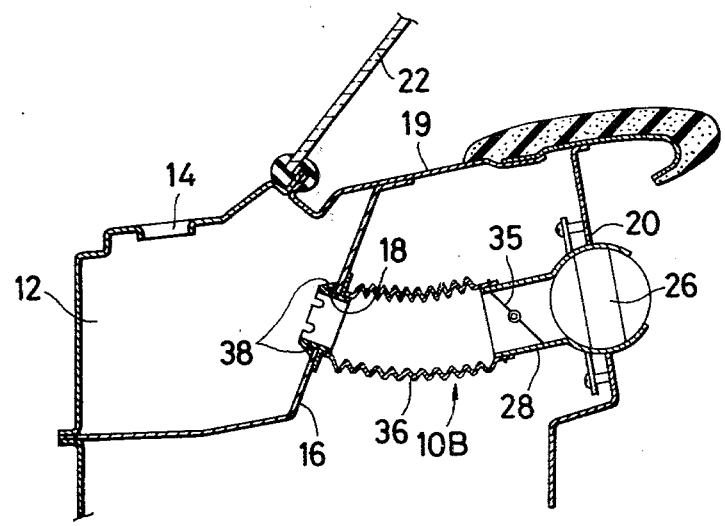

In FIG. 2, the second exemplary prior art air ventilation apparatus which is denoted by numeral 10B is shown as being mounted in the front section of the passenger compartment. Parts similar to those of FIG. 1 are designated by the same numerals as in the case of FIG. 1.

The air ventilation apparatus 10B shown comprises a flexible duct 36 fixed, via a fixing portion 38 formed thereon, to the dashboard 16 to the opening 18 of the same, and an air flow controller unit 26 supported via bolts (no numerals) by the instrument panel unit 20, the controller unit 26 being formed with a duct portion 28 coupled in the right open end of the flexible duct 36.

In assemblage, the flexible duct 36 is fixed to the dashboard 16 by means of the known fixing portion 38 thereof hanging down from dashboard 16, then the instrument panel unit 20 on which the air flow controller unit 26 has been previously mounted is connected to the rigid members of the vehicle such that the duct portion 28 extends toward the dashboard 16, and then the right open end of the flexible duct 36 is coupled with the duct portion 28.

However, the above coupling procedure should be made by stretching operators hand or hands awkwardly under, up and around to the back side of the instrument panel unit 20. In other words, the operator has to work blindly to couple the flexible duct 36 with the air flow controller unit 26. Obviously, this is very troublesome and difficult.

Thus, elimination of the above-mentioned drawbacks encountered in the conventional air ventilation apparatus is an essential object of the invention.

Figure 3:
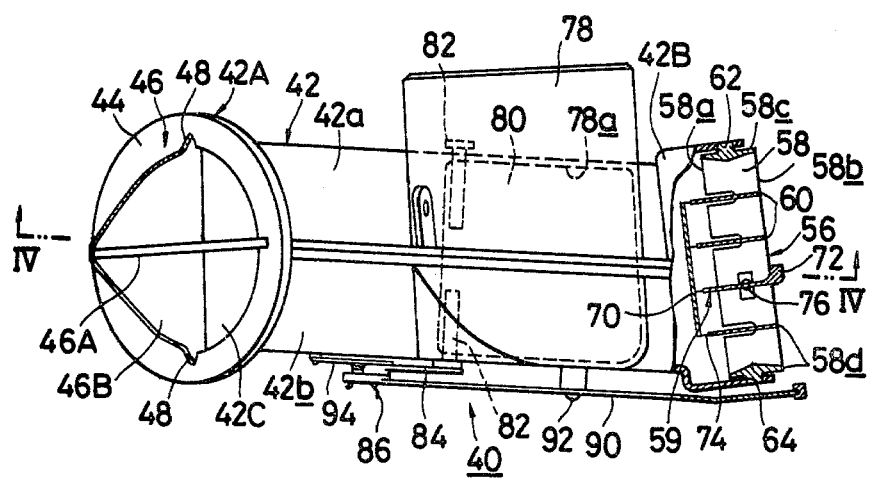
FIG. 3 is a partially cut away plan view of an air ventilation apparatus according to the present invention.
Figure 4:
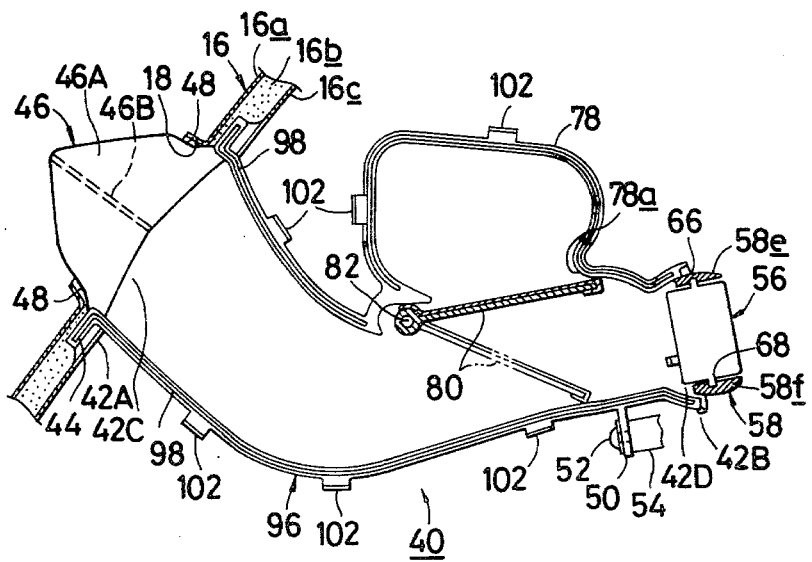
FIG. 4 is a sectional view taken along the line IV—IV of FIG. 3, showing one segment of a duct of the ventilation apparatus of the invention.

Referring to FIGS. 3 to 7, especially FIGS. 3 and 4, there is illustrated an embodiment of an air ventilation apparatus of the invention, which is generally denoted by numeral 40. The air ventilation apparatus 40, similar to the afore-mentioned conventional cases, is positioned in the space defined between the dashboard 16 and the instrument panel unit 20, as will be understood from FIG. 7. Thus, parts constituting the front section of the passenger compartment will be denoted by the same numerals as in the cases of FIGS. 1 and 2.

The ventilation apparatus 40 of the invention comprises a smoothly curved hollow body 42 constructed of plastics, which has a left open end 42A connected to the dashboard 16 (see FIG. 4) and open to the opening 18 of the same and a right open end 42B fixed to a given part of the instrument panel unit 20. As will become clear hereinafter, the connection of the left open end 42A of the body 42 with the opening 18 in the dashboard 16 is so made that a radially outwardly extending flange 44 formed on the left open end 42A strongly abuts upon a part of the dashboard 16 surrounding the opening 18.

As is best seen in FIG. 4, the dashboard 16 is composed of a steel panel 16a, an insulating soft material 16b, such as a glass wool, affixed to the steel panel 16a, and a covering layer 16c such as an asphalt layer lined on the insulating material 16b. The covering layer 16c is cut away at the periphery of the opening 18 so that the flange 44 of the hollow body 42 abuts or presses directly upon the insulating material 16b to compress the same as shown.

Designated by numeral 46 is a guide member which aids in locating the left open end 42A at the opening 18 of the dashboard 16 during the connection of same to the dashboard 16. The guide member 46 is composed of two intersecting tapered vanes 46A and 46B which are mounted at the mouth 42C of the left open end 42A to define an "arrow head" like configuration with the apex thereof projecting longitudinally outwardly from the mouth 42C of the body 42. The tapered vanes 46A and 46B are united at bases thereof to the flange 44. The tapered vanes 46A and 46B are respectively formed with inflection portions 48 which are engaged with the surface defining the opening 18 of the dashboard to allow the guide member (or tapered vanes) to be tightly held in the opening 18, as will become clear hereinafter.

The connection of the right open end 42B of the hollow body 42 with the instrument panel unit 20 is such made that flanges 50 provided on the right open end 42B are fixed via bolts 52 to a rigid member 54 extending from the instrument panel unit 20. As seen in FIG. 4, the extreme portion of the right open end 42b is enlarged to form a housing 42D in which an air flow controller 56 is operatively set. The air flow controller 56 comprises a rectangular parallelopiped casing 58 having aligned inlet and outlet openings 58a and 58b, and a vane unit 59 set in the casing 58. Side walls 58c and 58d of the casing 58 are respectively formed with outward projections (no numerals) which are pivotally disposed in aligned holes 62 and 64 formed in the housing 42D, so that the casing 58 is swingable about an imaginary line passing through the holes 62 and 64. The vane unit 59 comprises four parallelly spaced rectangular vanes 60 each of which is formed at the longitudinal edge portions thereof with projections (no numerals) which are respectively and pivotally disposed in holes 66 and 68 formed in upper and lower walls 58e and 58f of the casing 58, so that each vane is pivotable about an imaginary line passing through the holes 66 and 68. As seen in FIG. 3, a link bar 70 is hingedly connected to left hand ends of the vanes 60 to provide synchronous pivotable movements of the vanes 60. One of the vanes 60 is provided at its right hand end with a control knob 72.

With the above, it will be appreciated that the swingable movement of the vanes 60 with respect to the casing 58 is achieved by handling the knob 72 to move along the longitudinal axis of the casing 58 and the swingable movement of the casing 58 with respect to the housing portion 42b of the body 42 is achieved by handling the knob 72 to move along the longitudinal axis of the vane 60 to which the knob 72 is fixed. Thus, by handling the knob 72, air passing through the hollow body 42 can be oriented in any desired direction in the passenger compartment.

Preferably, the casing 58 and the vane unit 59 are constructed of ABS resin (Acrylonitrile-Butadiene-Styrene) and Polypropylene resin, respectively. Specifically, the vane unit 59 consisting of the vanes 60 with the knob 72, the projections formed on the vanes, the link bar 70 and hinged portions 74 between the vanes 60 and the link bar 70 are made of Polypropylene resin by means of monoblock casting. Furthermore, if desired, bearing members 76 made of polyacetal resin may be set in the lower wall 58f of the casing 58 at portions to which the vanes are pivotally mounted to achieve smooth and long life swinging function of the vane unit.

With this, economical construction is available in the air ventilation apparatus due to usage of the inexpensive ABS resin without sacrificing the movability of the vane unit 59 with respect to the casing 58 due to use of the polyacetal bearing members 76.

Designated by numeral 78 is a duct section extending from a part of the hollow body 42, which part defines therein an opening 78a to provide via the duct section 78 communication between the interior of the body 42 and an air conditioning unit (not shown) located also in the front section of the passenger compartment. Within the opening 78a is pivotally arranged a damper door 80 which operates to open and close the opening 78a. As seen in FIG. 4, the damper door 80 is fixed at the left end thereof with pivot pins 82 which pass through aligned openings (no numerals) formed in the opposed walls of the hollow body 42. As seen in FIG. 3, one of the pivot pins is connected at its outwardly projected head to an end of an arm 84 which is perpendicular to the pins 82. The arm 84 is formed at the other end thereof with an outwardly projected stud 86 which is loosely received in an elongate slot 88 formed in a left end of a control lever 90, as is shown in FIG. 5. The lever 90 extends toward the passenger compartment, through the instrument panel unit 20 as is understood from FIG. 7, and is pivotally supported at its generally middle portion by a stud 92 fixed to the wall of the main body 42. A spring 94 is arranged between the left end of the control lever 90 and the wall of the body 42 to allow the closing and opening operations of the damper door 80 to be made in a so-called snap action manner.

As is understood from FIG. 3, the hollow body 42 including the guide member 46 of the ventilation apparatus 40 of the invention is constructed of independently prefabricated two segments 42a and 42b which are provided by means of injection molding or the like. In other words, the hollow body 42 hereinshown is divisible into two segments 42a and 42b along an imaginary plane including in it the longitudinal axis of the body 42. Denoted by numeral 96 in FIG. 4 is a flange which is formed along the divided edge of the segment 42a, the flange 96 being neatly in contact with another flange 97 formed on the other segment 42b for forming the segments 42a and 42b into a single tubular structure or the hollow body 42. The flange 96 is formed there-throughout with a ridge 98 which is snugly received in a groove 100 formed in the flange 97 of the other segment 42b, as will be understood from FIG. 6, to provide hermetical sealing therebetween. The flange 96 is further formed at spaced intervals with a number of lugs each having an enlarged head. The lugs 102 are snugly disposed in corresponding holes 104 formed in the flange 97 of the segment 42b and locked to each other so that the two segments 42a and 42b are tightly assembled to have a rigid construction. The air flow controller 56 is set in the housing 42D during the assemblage of these two segments 42a and 42b.

In mounting the ventilation apparatus 40 to the front section of the passenger compartments, the following steps are adopted. (For easy understanding, the explanation will be made with reference to FIG. 7).

1. Uniting the ventilation apparatus 40 and the instrument panel unit 20 by connecting the flange 50 of the apparatus 40 to the rigid member 54 of the instrument panel unit 20 with the bolts 52;

2. placing the unit thus formed at a position, as shown, where the guide member 46 of the ventilation apparatus 40 is about to be received in the opening 18 of the dashboard 16;

3. moving the unit toward the cowl box 12 to a position where the instrument panel unit 20 is set in a given position with respect to the horizontal panel 19 and simultaneously the guide member 46 of the apparatus 40 is tightly and completely held in the opening 18 of the dashboard 16 in such a manner as is shown in FIG. 4;

4. fixing the instrument panel unit 20 to the horizontal panel by using bolts (not shown).

It should be noted that the insertion of the guide member 46 into the opening 18, which is in the step (3), can be easily made since the guide member 46 is formed into arrow like structure. In fact, a slight insertion of the guide member 46 at its apex portion to the opening 18 tends to guide the entire guide member 46 into the opening 18. Further, it should be noted that since the insulator 16b of the dashboard 16 upon which the flange 44 of the body 42 presses is made of compressible material, sufficient sealing between the left open end 42A of the body 42 and the dashboard 16 is made even when exact placement of the body 42 with respect to the opening 18 is not provided.

In addition to the above, the following modifications are available in the invention:

The flange 44 on the body 42 may be unnecessary so long as the guide member 46 has a section, such as the inflection portion 48, which abuts against the surface defining the opening 18 of the dashboard 16.

Although in the previous description, it has been explained that the guide member 46 is made of two intersecting tapered vanes, it is also possible to use only one vane having, for example, isosceles triangular shape. In this case, of course, the vane should be mounted on the mouth 42C of the body 42 in a manner that the vertex defined by the equal side segments thereof directs longitudinally outwardly from the mouth 42C by the same reason as has been mentioned.

What is claimed is:

1. An air ventilation apparatus mounted in a vehicle having a partition wall and an instrument panel which are spaced from each other to define therebetween a considerable space, said partition wall being formed with an opening which is communicable with the open air surrounding said vehicle, said ventilation appartaus comprising:

a hollow body having a first open end attached to said partition wall to open to said opening of the same and a second open end supported by said instrument panel; and means for locating said first open end of said hollow body with respect to said opening of said partition wall while permitting the open air to flow into said hollow body, said locating and permitting means comprising at least two intersecting tapered vanes which are integrally mounted on the mouth of said first open end of said hollow body and combine to form an arrow head-like configuration with the apex thereof projecting longitudinally outwardly from said mouth, each of said tapered vanes including means defining portions near its base section, inflection portions which are engaged with the boundary surface defining the opening of said partition wall to allow the combined vanes to be tightly held in said opening wherein said locating and permitting means permits a substantially unobstructed air flow into said hollow body.

2. An air ventilation apparatus as claimed in claim 1, in which said hollow body is formed with a flange portion which extends radially outwardly from said first open end thereof, said flange portion being attached to said partition wall to hold said first open end in place with respect to said partition wall.

3. An air ventilation apparatus as claimed in claim 1, in which said hollow body is longitudinally divisible into two segments which are independently pre-fabricated.

4. An air ventilation apparatus as claimed in claim 3, in which one of said segments is formed with a flange portion extending along the dividing edge thereof, the flange portion being in contact with another flange portion formed on the other segment to form said two segments into a single tubular structure.

5. An air ventilation apparatus as claimed in claim 4, in which the flange portion on said one segment is formed therethrough with a ridge which is snugly received in a groove formed in the flange portion on the other segment so that the mated flange portions are hermetically sealed.

6. An air ventilation apparatus as claimed in claim 5, in which the flange portions of one of said segments are formed, at spaced intervals, with a plurality of lugs each having an enlarged head, and in which the flange portions of the other segment are formed with a plurality of holes to receive therein said lugs to be locked to each other so that the assembled segments of said hollow body have a rigid construction.

7. An air ventilation apparatus as claimed in claim 1, further comprising an air flow controller which is disposed in the second open end of said hollow body for manually controlling the flow direction of air fed through said hollow body into the passenger compartment of said vehicle.

* * * * *